(12) United States Patent
Tada et al.

(10) Patent No.: US 11,411,449 B2
(45) Date of Patent: Aug. 9, 2022

(54) ROTATING ELECTRICAL MACHINE WITH ROTOR HAVING ARCH SHAPED PERMANENT MAGNETS WITH PERPENDICULAR REFERENCE SURFACE

(71) Applicant: TDK Corporation, Tokyo (JP)

(72) Inventors: Atsushi Tada, Tokyo (JP); Ko Yanagihara, Tokyo (JP); Shinji Yoshida, Tokyo (JP)

(73) Assignee: TDK Corporation, Tokyo (JP)

( * ) Notice: Subject to any disclaimer, the term of this patent is extended or adjusted under 35 U.S.C. 154(b) by 38 days.

(21) Appl. No.: 16/708,708

(22) Filed: Dec. 10, 2019

(65) Prior Publication Data
US 2020/0195069 A1    Jun. 18, 2020

(30) Foreign Application Priority Data
Dec. 14, 2018    (JP) .............................. JP2018-234575

(51) Int. Cl.
*H02K 1/27*    (2022.01)
*H02K 1/276*    (2022.01)
*H02K 21/14*    (2006.01)

(52) U.S. Cl.
CPC ........... *H02K 1/276* (2013.01); *H02K 1/2766* (2013.01); *H02K 21/14* (2013.01); *H02K 2213/03* (2013.01)

(58) Field of Classification Search
CPC ...... H02K 1/274; H02K 1/276; H02K 1/2766; H02K 21/14; H02K 2213/03
USPC .................................................... 310/156.45
See application file for complete search history.

(56) References Cited

U.S. PATENT DOCUMENTS

| | | | | |
|---|---|---|---|---|
| 3,293,466 A | * | 12/1966 | Henry-Baudot | H02K 23/04 310/154.46 |
| 4,112,320 A | * | 9/1978 | Mohr | H02K 23/20 310/154.25 |
| 4,219,752 A | * | 8/1980 | Katou | H02K 1/2786 310/156.19 |
| 5,105,113 A | * | 4/1992 | Ishikura | H02K 23/04 310/154.29 |
| 5,744,895 A | * | 4/1998 | Seguchi | B60K 6/365 903/952 |
| 5,751,089 A | * | 5/1998 | Stridsberg | H02K 16/04 310/266 |
| 5,783,893 A | * | 7/1998 | Dade | H02K 16/00 310/266 |

(Continued)

FOREIGN PATENT DOCUMENTS

JP    2018-170940 A    11/2018

*Primary Examiner* — Maged M Almawri
(74) *Attorney, Agent, or Firm* — Faegre Drinker Biddle & Reath LLP

(57) ABSTRACT

It can be considered that a cross-sectional shape of a permanent magnet having a parallel reference surface is obtained by removing a portion from a cross-sectional shape of a permanent magnet which does not have the parallel reference. A cross-sectional area of the permanent magnet is further reduced than that of the permanent magnet which does not have the parallel reference surface. In addition, also a magnet volume of the permanent magnet is further reduced than that of the permanent magnet that does not have the parallel reference surface. The inventors have confirmed that a decrease in magnet volume induced by the parallel reference surface does not affect the characteristics of an IPM motor.

6 Claims, 18 Drawing Sheets

(56) References Cited

U.S. PATENT DOCUMENTS

| | | | | |
|---|---|---|---|---|
| 5,994,809 A * | 11/1999 | Ackermann | H02K 49/102 | 310/112 |
| 6,459,185 B1 * | 10/2002 | Ehrhart | H02K 16/04 | 310/156.45 |
| 7,119,468 B2 * | 10/2006 | Shkondin | H02K 16/02 | 310/156.01 |
| 7,556,082 B2 * | 7/2009 | Welchko | H02K 15/03 | 164/95 |
| 8,106,609 B2 * | 1/2012 | Haussecker | H02K 23/04 | 310/68 B |
| 8,680,732 B2 * | 3/2014 | Kamei | H02K 1/2766 | 310/156.53 |
| 9,106,121 B2 * | 8/2015 | Kusase | H02K 21/14 | |
| 10,020,698 B2 * | 7/2018 | Kondou | H02K 3/12 | |
| 10,084,354 B2 * | 9/2018 | Baba | H02K 1/2766 | |
| 10,186,360 B2 * | 1/2019 | Shimbo | H01F 7/021 | |
| 10,700,560 B2 * | 6/2020 | Hisanabe | H02K 1/02 | |
| 2003/0025414 A1 * | 2/2003 | Kaneko | H02K 1/2786 | 310/156.38 |
| 2004/0017123 A1 * | 1/2004 | Miyashita | H02K 21/14 | 310/156.53 |
| 2005/0040721 A1 * | 2/2005 | Kusase | H02K 1/278 | 310/156.43 |
| 2005/0077802 A1 * | 4/2005 | Toujima | H02K 16/02 | 310/156.56 |
| 2006/0192454 A1 * | 8/2006 | Yamada | H02K 29/03 | 310/154.22 |
| 2007/0096574 A1 * | 5/2007 | Romagny | B60K 6/448 | 310/112 |
| 2007/0096579 A1 * | 5/2007 | Aydin | H02K 1/2766 | 310/156.56 |
| 2008/0129135 A1 * | 6/2008 | Chen | H02K 16/04 | 310/254.1 |
| 2009/0021089 A1 * | 1/2009 | Nashiki | H02K 21/145 | 310/46 |
| 2009/0096314 A1 * | 4/2009 | Atarashi | H02K 16/02 | 310/156.53 |
| 2009/0224624 A1 * | 9/2009 | Kumar | H02K 1/246 | 310/156.53 |
| 2010/0007232 A1 * | 1/2010 | Komuro | H02K 1/02 | 310/156.01 |
| 2010/0139999 A1 * | 6/2010 | Park | H02K 7/102 | 310/114 |
| 2010/0213885 A1 * | 8/2010 | Ichiyama | H02K 21/12 | 310/156.46 |
| 2011/0193439 A1 * | 8/2011 | Yabe | H02K 1/276 | 310/156.38 |
| 2011/0285238 A1 * | 11/2011 | Kusase | H02K 16/04 | 310/156.48 |
| 2012/0091845 A1 * | 4/2012 | Takemoto | H02K 1/276 | 310/156.01 |
| 2012/0104892 A1 * | 5/2012 | Kamei | H02K 1/2766 | 310/156.53 |
| 2012/0194026 A1 * | 8/2012 | Matsuoka | H02K 1/2766 | 310/156.53 |
| 2012/0200184 A1 * | 8/2012 | Takeuchi | H02K 21/12 | 310/112 |
| 2012/0242182 A1 * | 9/2012 | Yabe | H02K 1/276 | 310/156.53 |
| 2013/0093275 A1 * | 4/2013 | Kim | H02K 16/04 | 310/114 |
| 2013/0169101 A1 * | 7/2013 | Deng | H02K 1/276 | 310/156.53 |
| 2013/0264895 A1 * | 10/2013 | Kondou | H02K 1/06 | 310/46 |
| 2013/0313938 A1 * | 11/2013 | Yamada | H02K 1/2706 | 310/156.69 |
| 2013/0342066 A1 * | 12/2013 | Taniguchi | H02K 1/28 | 310/156.28 |
| 2014/0159532 A1 * | 6/2014 | Kondou | H02K 1/27 | 310/156.53 |
| 2014/0167549 A1 * | 6/2014 | Huang | H02K 1/246 | 310/156.07 |
| 2014/0217859 A1 * | 8/2014 | Saito | H02K 1/276 | 310/68 D |
| 2015/0097642 A1 * | 4/2015 | Takagi | H01F 7/021 | 335/306 |
| 2015/0125337 A1 * | 5/2015 | Tsukada | C22C 38/002 | 425/78 |
| 2015/0288233 A1 * | 10/2015 | Kim | H02K 1/2766 | 310/156.01 |
| 2015/0303749 A1 * | 10/2015 | Okubo | H02K 21/14 | 310/156.38 |
| 2015/0364959 A1 * | 12/2015 | Oketani | H02K 1/276 | 310/156.11 |
| 2016/0172912 A1 * | 6/2016 | Nigo | F04B 39/0005 | 417/415 |
| 2017/0162311 A1 * | 6/2017 | Shimbo | G01R 33/383 | |
| 2017/0338715 A1 * | 11/2017 | Li | H02K 7/08 | |
| 2018/0083499 A1 * | 3/2018 | Hisanabe | H02K 1/02 | |
| 2018/0268976 A1 * | 9/2018 | Yasumura | H01F 41/0253 | |
| 2018/0287441 A1 | 10/2018 | Kitaoka et al. | | |
| 2019/0149000 A1 * | 5/2019 | Hosoda | H02K 21/16 | 310/156.07 |
| 2020/0021152 A1 * | 1/2020 | Xu | H02K 1/28 | |
| 2020/0091806 A1 * | 3/2020 | Shin | H02K 29/03 | |
| 2021/0006110 A1 * | 1/2021 | Dong | H02K 1/276 | |
| 2021/0044167 A1 * | 2/2021 | Huang | H02K 29/03 | |
| 2021/0104942 A1 * | 4/2021 | Katsuta | B60K 7/0007 | |

* cited by examiner

ROTATING ELECTRICAL MACHINE WITH ROTOR HAVING ARCH SHAPED PERMANENT MAGNETS WITH PERPENDICULAR REFERENCE SURFACE

CROSS-REFERENCE TO RELATED APPLICATIONS

This application is based upon and claims the benefit of priority from Japanese Patent Application No. 2018-234575, filed on 14 Dec. 2018, the entire contents of which are incorporated herein by reference.

TECHNICAL FIELD

The present disclosure relates to a permanent magnet and a rotating electrical machine.

BACKGROUND

In the related art, as a rotating electrical machine, there has been known an IPM motor which is one type of inner rotor motor and in which a permanent magnet is embedded in a rotor (for example, Japanese Unexamined Patent Publication No. 2018-170940).

SUMMARY

As the permanent magnet embedded in the rotor of the IPM motor, the inventors have been researching a permanent magnet having an arc shape cross section, which more easily realizes a desired magnetic distribution than a rectangular parallelepiped permanent magnet, rather than the rectangular parallelepiped permanent magnet which has been adopted in the related art. As a result, the inventors have newly found a technique that is capable of reducing a magnet volume while maintaining motor characteristics.

According to the present disclosure, there is provided a permanent magnet and a rotating electrical machine in which it is possible to reduce a magnet volume while maintaining the characteristics of the rotating electrical machine.

A permanent magnet according to an aspect of the present disclosure has an arc shape cross section defined by an outer arc, an inner arc, and a pair of end sides connecting an end point of the outer arc and an end point of the inner arc, and has at least either one of a parallel reference surface and a perpendicular reference surface, the parallel reference surface is provided in a side surface defined by the end side and is parallel to a direction of a bisector of an opening angle of the inner arc in the cross section, the perpendicular reference surface is provided in an outer peripheral surface defined by the outer arc and is perpendicular to the direction of the bisector of the opening angle of the inner arc in the cross section.

In the permanent magnet, the parallel reference surface reduces the magnet volume of a portion of the side surface, and the perpendicular reference surface reduces the magnet volume of a portion of the outer peripheral surface. The inventors have obtained the knowledge that a decrease in magnet volume induced by the parallel reference surface and the perpendicular reference surface does not affect the characteristics of a rotating electrical machine. Therefore, according to the permanent magnet including at least either one of the parallel reference surface and the perpendicular reference surface, it is possible to reduce the magnet volume while maintaining the characteristics of the rotating electrical machine.

In the permanent magnet according to another aspect, in the cross section, when a length of the parallel reference surface in the direction of the bisector of the opening angle of the inner arc is h and a length on a first reference line passing through the end point of the inner arc and parallel to the direction of the bisector of the opening angle of the inner arc is H, $0.3 \leq h/H \leq 0.8$ is satisfied. In this case, the characteristics of the rotating electrical machine are maintained with a higher probability.

In the permanent magnet according to another aspect, in the cross section, when a length of the perpendicular reference surface in a direction orthogonal to the direction of the bisector of the opening angle of the inner arc is w and a length on a second reference line passing through the end points of the outer arc and orthogonal to the direction of the bisector of the opening angle of the inner arc is W, $0.3 \leq w/W \leq 0.8$ is satisfied. In this case, the characteristics of the rotating electrical machine are maintained with a higher probability.

The permanent magnet according to another aspect is radially magnetized with reference to a virtual center which is positioned close to the inner arc in the cross section.

In the permanent magnet according to another aspect, a range of an opening angle $\theta$ of the inner arc is $10° \leq \theta \leq 90°$.

The permanent magnet according to another aspect includes both of the parallel reference surface and the perpendicular reference surface.

According to an aspect of the present disclosure, there is provided a rotating electrical machine that includes a rotor having a shaft and a rotor core to which a plurality of permanent magnets are attached so as to surround the shaft, and a stator disposed on an outer periphery of the rotor and having a plurality of coils, in which the permanent magnet has an arc shape cross section defined by an outer arc, an inner arc, and a pair of end sides, each of which connects an end point of the outer arc to an end point of the inner arc, and has at least either one of a parallel reference surface which is provided in a side surface defined by the end side and is parallel to a direction of a bisector of an opening angle of the inner arc in the cross section, and a perpendicular reference surface which is provided in an outer peripheral surface defined by the outer arc and is perpendicular to the direction of the bisector of the opening angle of the inner arc in the cross section.

In the permanent magnet of the rotating electrical machine, the parallel reference surface reduces the magnet volume of a portion of the side surface, and the perpendicular reference surface reduces the magnet volume of a portion of the outer peripheral surface. The inventors have obtained the knowledge that a decrease in magnet volume induced by the parallel reference surface and the perpendicular reference surface does not affect the characteristics of a rotating electrical machine. Therefore, it is possible to reduce the magnet volume of the permanent magnet while maintaining the characteristics of the rotating electrical machine.

DETAILED DESCRIPTION

Figure 1:
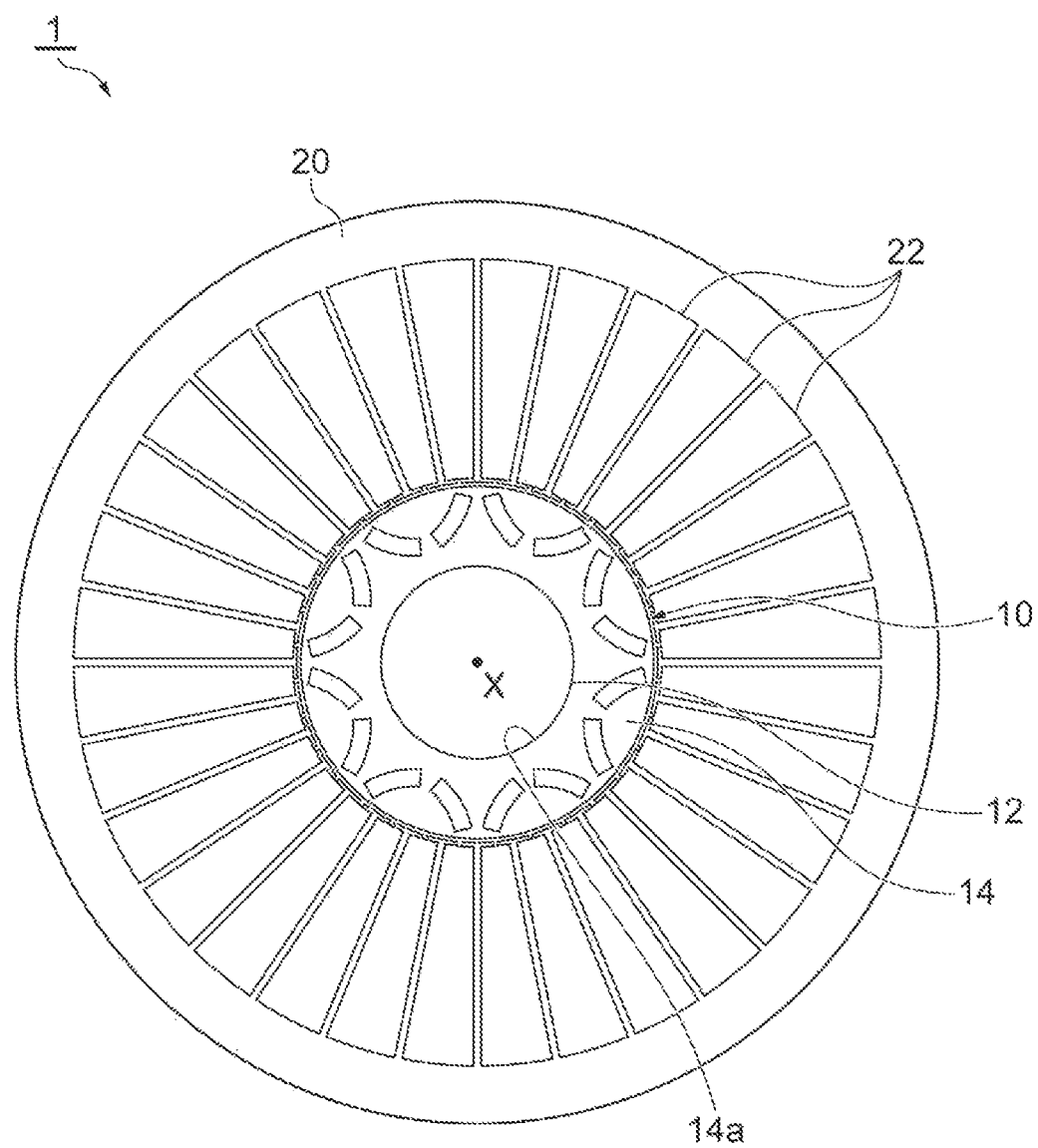
FIG. 1 is a schematic cross-sectional view illustrating an IPM motor according to one embodiment of the present disclosure.

Hereinafter, various embodiments and examples will be described with reference to the drawings. Incidentally, in the drawings, the same reference signs will be assigned to the same or equivalent parts, and duplicated descriptions will be omitted.

In embodiments illustrated hereinafter, a motor (more specifically, IPM motor) will be described as an example of a rotating electrical machine. FIG. 1 illustrates an IPM motor 1 according to an embodiment. FIG. 1 illustrates a cross section of the IPM motor 1, which is orthogonal to a rotation axis X. The IPM motor 1 is an inner rotor motor which has a rotor 10 and a stator 20 and in which the rotor 10 is positioned inside the stator 20. In the present embodiment, the IPM motor 1 has a configuration of 8 poles and 32 slots.

The rotor 10 is configured to include a shaft 12 and a rotor core 14.

The shaft 12 has a columnar shape and extends in a direction perpendicular to the sheet of FIG. 1. The shaft 12 is formed of for example, stainless steel or the like.

The rotor core 14 has a cylindrical shape and has a shaft hole 14a thereinside. The shaft 12 is fitted into the shaft hole 14a of the rotor core 14. The rotor core 14 and the shaft 12 rotate integrally around the rotation axis X. The rotor core 14 is formed of for example, laminated steel sheets. In the present embodiment, the rotor core 14 has an outer diameter of 76 mm and an inner diameter of 41.2 mm.

Figure 2:
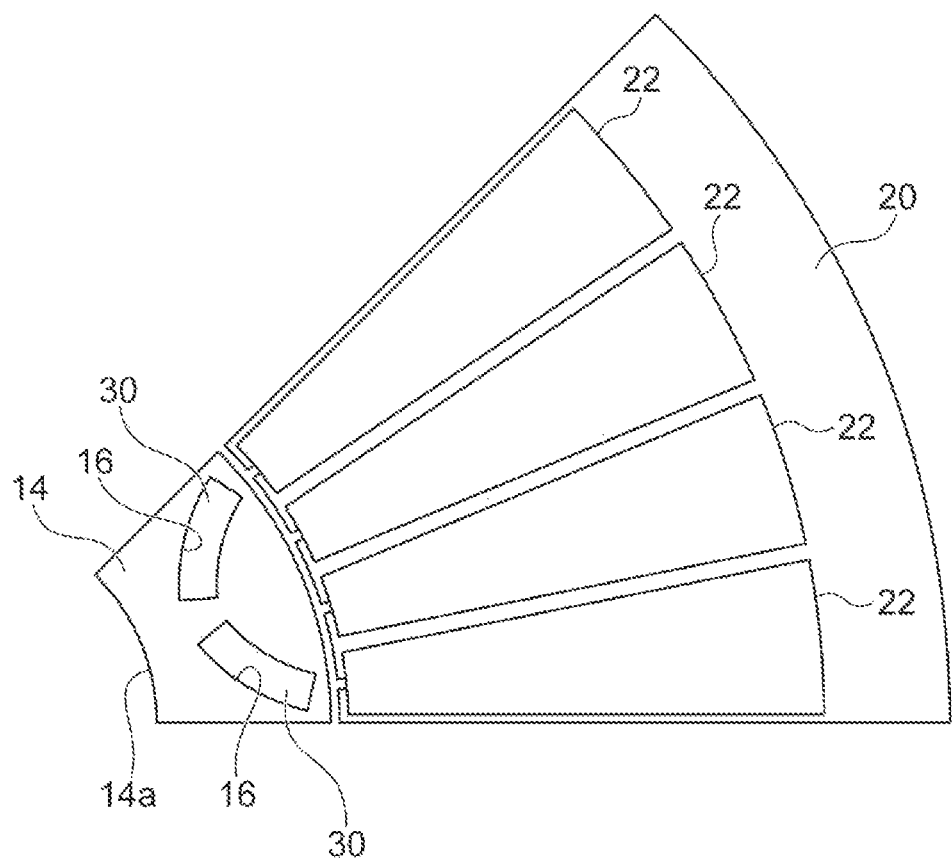
FIG. 2 is a main part enlarged view of the IPM motor illustrated in FIG. 1.
Figure 3:
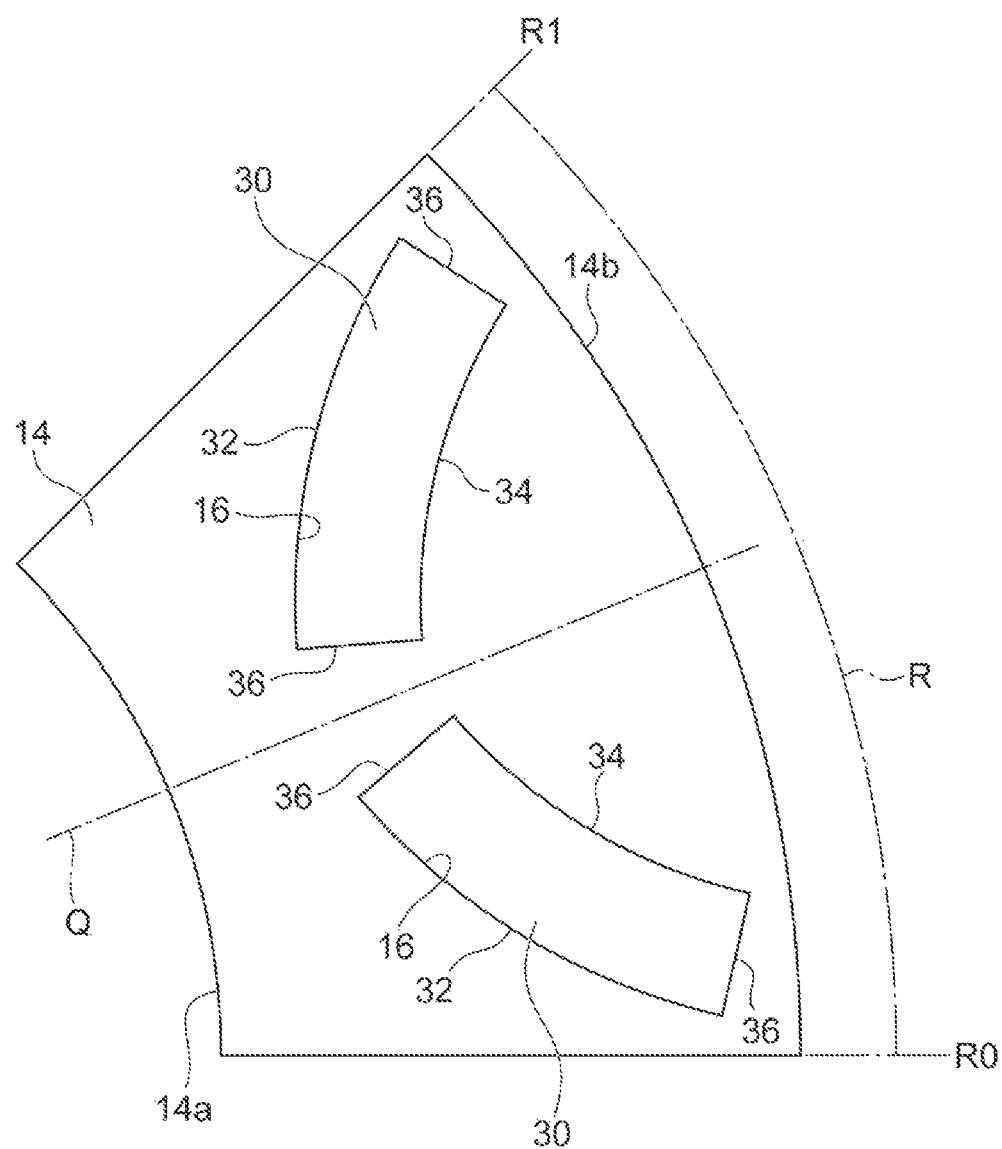
FIG. 3 is a view illustrating a rotor illustrated in FIG. 2.
Figure 4:
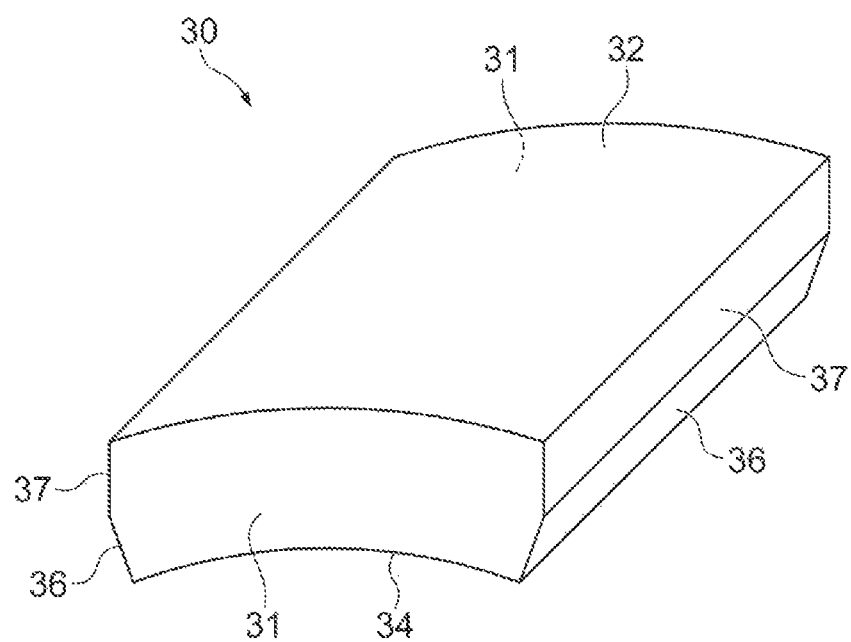
FIG. 4 is a schematic perspective view of a permanent magnet illustrated in FIG. 3.

As illustrated in FIGS. 2 to 4, the rotor core 14 has a plurality of permanent magnets 30. The plurality of permanent magnets 30 may be permanent magnets formed of the same material. In the present embodiment, each of the permanent magnet 30 is formed of a rare earth based permanent magnet, for example, may be an R-T-B based permanent magnet. In addition, among the R-T-B based permanent magnets, the permanent magnet 30 may be an R-T-B based sintered magnet. The R-T-B based sintered magnet has grains (crystal grains) consisting of $R_2T_{14}B$ crystals, and grain boundaries. Each of the permanent magnets 30 is not limited to the sintered magnet, and may be a bonded magnet or a hot worked magnet.

R in the R-T-B based sintered magnet is at least one of rare earth elements. The rare earth elements are Sc, Y, and lanthanoid elements belonging to Group 3 in the long-period periodic table. The lanthanoid elements include, for example, La, Ce, Pr, Nd, Sm, Eu, Gd, Tb, Dy, Ho, Er, Tm, Yb, Lu, and the like. T in the R-T-B based sintered magnet is Fe, or Fe and Co. Furthermore, T may include one or more selected from other transition metal elements. B in the R-T-B based sintered magnet is boron (B), or boron (B) and carbon (C).

The R-T-B based sintered magnet according to the present embodiment may include Cu, Al, or the like. It is possible to attain a high coercive force or a high corrosion resistance, or to improve the temperature characteristics of magnetic properties by adding these elements.

Furthermore, the R-T-B based sintered magnet according to the present embodiment may include Dy, Tb, or both as a heavy rare earth element. The heavy rare earth element may be included in the crystal grains and the grain boundaries. If the heavy rare earth element is not substantially included in the crystal grains, the heavy rare earth element may be included in the grain boundaries. The concentration of the heavy rare earth element at the grain boundaries may be higher than the concentration thereof in the crystal grains. The R-T-B based sintered magnet according to the present embodiment may be an R-T-B based sintered magnet in which the heavy rare earth element is diffused along grain boundaries. It is possible to further improve the residual magnetic flux density and the coercive force of the R-T-B based sintered magnet in which the heavy rare earth element is diffused along the grain boundaries, with a smaller amount of the heavy rear earth elements, compared to those of an R-T-B based sintered magnet in which the heavy rare earth element is not diffused along grain boundaries. Incidentally, if the R-T-B based sintered magnet in which the heavy rare earth element is diffused along the grain boundaries is used as the permanent magnet 30 according to the present embodiment, it is possible to use a magnet in which the heavy rare earth element is in its entirety diffused along grain boundaries rather than a magnet in which the heavy rare earth element is partly diffused along grain boundaries. Since the permanent magnet has the above-mentioned configuration, the productivity improves and the cost decreases.

In addition, if the permanent magnet 30 according to the present embodiment is an R-T-B based permanent magnet, the R-T-B based permanent magnet is not limited to the R-T-B based sintered magnet that is produced by sintering as described above. For example, an R-T-B based permanent magnet which is produced by hot forming and hot working instead of sintering may be used.

If hot forming is performed such that a cold formed body, which is obtained by forming raw material powder at a room temperature, is pressurized while being heated, it is possible to eliminate air pores remaining in the cold formed body and densifying the cold formed boy without performing sintering. Furthermore, it is possible to obtain an R-T-B based permanent magnet having a desired shape and having magnetic anisotropy by performing hot extrusion as hot working on a formed body that is obtained by hot forming.

Each of the permanent magnets 30 is accommodated in a magnet hole 16 extending parallel to the rotation axis X of the rotor 10. The inner dimensions of the magnet hole 16 are designed slightly larger than the external dimensions of the permanent magnet 30 which will be described later. For this reason, the position or the posture of the permanent magnet 30 is not changed in the magnet hole 16.

The stator 20 is a cylindrical member that is provided to surround an outer periphery of the rotor 10. A plurality (32 pieces in the present embodiment) of coils 22 are arranged on an inner peripheral side of the stator 20. The plurality of coils 22 are arranged at equal angular intervals with respect to the rotation axis X of the rotor 10. If an alternating voltage is applied from an inverter circuit (not illustrated) or the like to the plurality of coils 22, a rotating magnetic field is formed on the inner peripheral side of the stator 20. In the present embodiment, the stator 20 has an outer diameter of 200 mm and an inner diameter of 78 mm.

In the present embodiment, the rotor 10 includes eight pairs of the permanent magnets 30 having the same shape. The eight pairs of the permanent magnets 30 are pairs of the permanent magnets 30 that are arranged at equal angular intervals with respect to the rotation axis X. As illustrated in FIG. 3, when seen from the direction of the rotation axis X, each pair of the permanent magnets 30 are line-symmetrically arranged with respect to a virtual line Q passing through the rotation axis X of the rotor 10. Specifically, the permanent magnets 30 forming a pair are arranged in an inclined manner so as to form a substantially U shape (or a substantially V shape), and are slightly separate (for example, 5 mm) from each other in a direction orthogonal to the virtual line Q. In addition, both of the permanent magnets 30 forming a pair have an end surface shape and a cross-sectional shape which are arch shapes when seen from the direction of the rotation axis X. Inner arc sides of the permanent magnets 30 are arranged so as to face an outer peripheral surface 14b of the rotor core 14. In the present embodiment, bisectors L (which will be described later) of the permanent magnets 30 forming a pair intersect each other at an angle of 74°. In addition, in the present embodiment, the permanent magnet 30 is not exposed to the outer peripheral surface 14b of the rotor core 14, and is positioned slightly inside (for example, 2.2 mm) from the outer peripheral surface 14b. Furthermore, in the present embodiment, four coils 22 of the stator 20 correspond to a pair of the permanent magnets 30 of the rotor core 14.

Consecutively, the shape of the permanent magnet 30 will be described with reference to FIGS. 4 and 5.

As illustrated in FIG. 4, the permanent magnet 30 has a long shape extending in one direction. The permanent magnet 30 is arranged in the magnet hole 16 of the rotor core 14 such that the extending direction is parallel to the rotation axis X of the rotor 10. The length of the permanent magnet 30 in the extending direction is 20 mm as an example.

Figure 5:
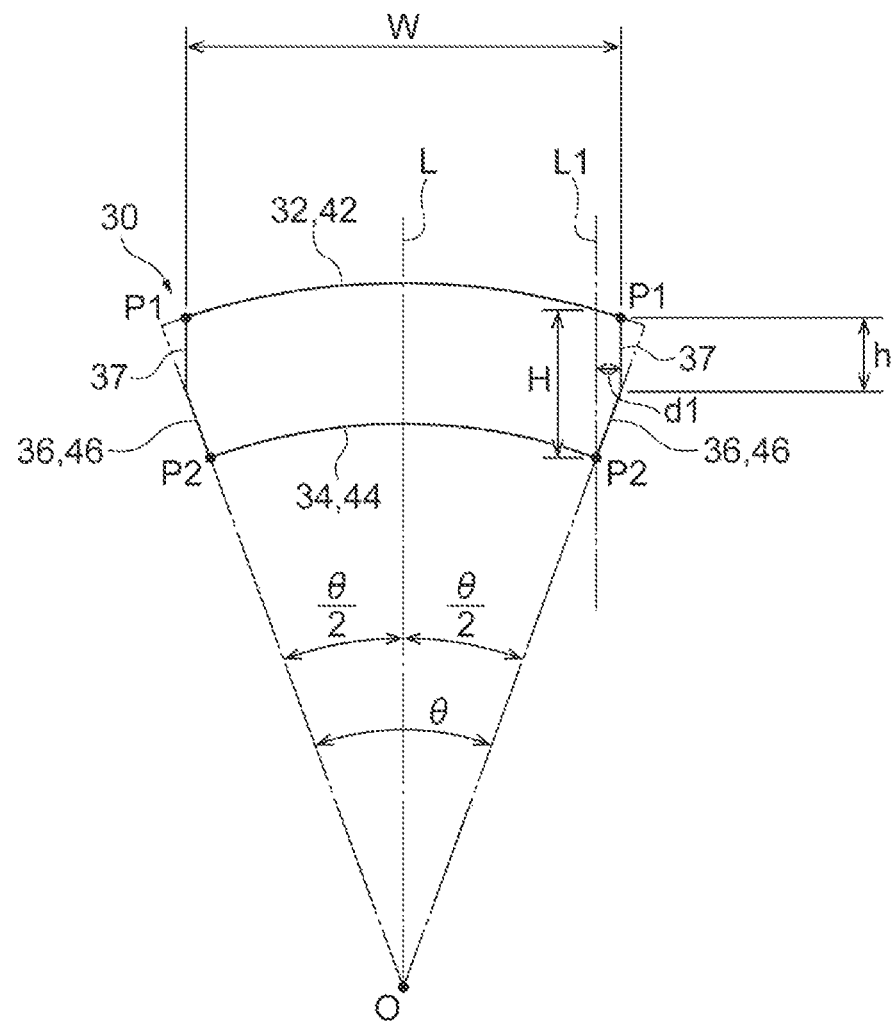
FIG. 5 is a schematic cross-sectional view of the permanent magnet illustrated in FIG. 4.

As illustrated in FIG. 5, the shapes of a cross section and an end surface of the permanent magnet 30 which are orthogonal to the extending direction are arch shapes. More specifically, the permanent magnet 30 has an arc shape cross section that is defined by an outer arc 42, an inner arc 44, and a pair of end sides 46, each of which connects an end point P1 of the outer arc 42 to an end point P2 of the inner arc 44. In the present embodiment, a center O of curvature of the outer arc 42 coincides with the center O of curvature of the inner arc 44. However, a slight offset between the center of curvature of the outer arc 42 and the center of curvature of the inner arc 44 can be allowed as long as not causing a problem in practical use. The cross-sectional shape of the permanent magnet 30 can be described as being a fan shape, an arc shape, a bow shape, a C shape, or a U shape other than an arch shape.

An exterior surface of the permanent magnet 30 is formed of a pair of end surfaces 31 facing each other in the extending direction; an outer peripheral surface 32 defined by the outer arc 42; an inner peripheral surface 34 defined by the inner arc 44; and side surfaces 36 defined by the end sides 46.

In a cross-sectional shape of the permanent magnet 30 illustrated in FIG. 5, an opening angle (central angle) θ of the inner arc 44 is selected in a range of $10°\leq\theta\leq90°$. In the present embodiment, the opening angle θ of the inner arc 44 is 40°. In addition, in the present embodiment, in the permanent magnet 30, the diameter (outer diameter) of the outer arc 42 is 37.5 mm, and the diameter (inner diameter) of the inner arc 44 is 30 mm.

The permanent magnet 30 has a parallel reference surface 37 in each of the side surfaces 36. The parallel reference surface 37 is a surface that is parallel to the direction of the bisector L of the opening angle θ of the inner arc 44. The parallel reference surface 37 is positioned closer to the outside (that is, on a side separate from the bisector L) than the end point P2 of the inner arc 44. A length (hereinafter, referred to as a reference surface length) h of the parallel reference surface 37 in the direction of the bisector L is 3.96 mm as an example. The reference surface length h of the parallel reference surface 37 depends on a separation distance d1 between a first reference line L, which passes through the end point P2 of the inner arc 44 and is parallel to the bisector L, and the parallel reference surface 37. The shorter the separation distance d1 becomes, the longer the reference surface length h becomes. If the length of the permanent magnet 30 on the first reference line L1 is H, the reference surface length h of the parallel reference surface 37 can be set so as to satisfy a relationship of $0.3\leq h/H\leq0.8$.

In the cross-sectional shape illustrated in FIG. 5, the position of the end point P1 of the outer arc 42 is determined by the position (that is, the separation distance d1) of the parallel reference surface 37. In addition, if the positions of both ends point P1 of the outer arc 42 are determined, a width dimension W of the permanent magnet 30 is determined. The width dimension W is the length of the permanent magnet 30 in a direction orthogonal to the direction of the bisector L. The width dimension W of the permanent magnet 30 is 23.09 mm as an example.

It can be considered that the cross-sectional shape of the permanent magnet 30 having the parallel reference surface 37 is obtained by removing a portion (a portion defined by the two-dot chain line in FIG. 5) from the cross-sectional shape of a permanent magnet which does not have the parallel reference surface 37. The cross-sectional area of the permanent magnet 30 is further reduced than that of the permanent magnet which does not have the parallel reference surface 37. In addition, also the magnet volume of the permanent magnet 30 is further reduced than that of the permanent magnet that does not have the parallel reference surface 37.

The permanent magnet 30 is magnetized in a radial direction thereof. In the present embodiment, the center O of curvature of the outer arc 42 and the inner arc 44 is a virtual center, and the permanent magnet 30 is radially magnetized with reference to the virtual center. The virtual center may be positioned close to the inner arc 44 in the cross section, and may not necessarily be the center O of curvature. The permanent magnet 30 may be magnetized before the permanent magnet 30 is assembled into the rotor core 14, or may be magnetized in a state where the permanent magnet 30 is assembled into the rotor core 14. If the magnetization is performed as described above, magnetic pole surfaces are formed in the outer peripheral surface 32 and the inner peripheral surface 34 of the permanent magnet 30.

Figure 6:
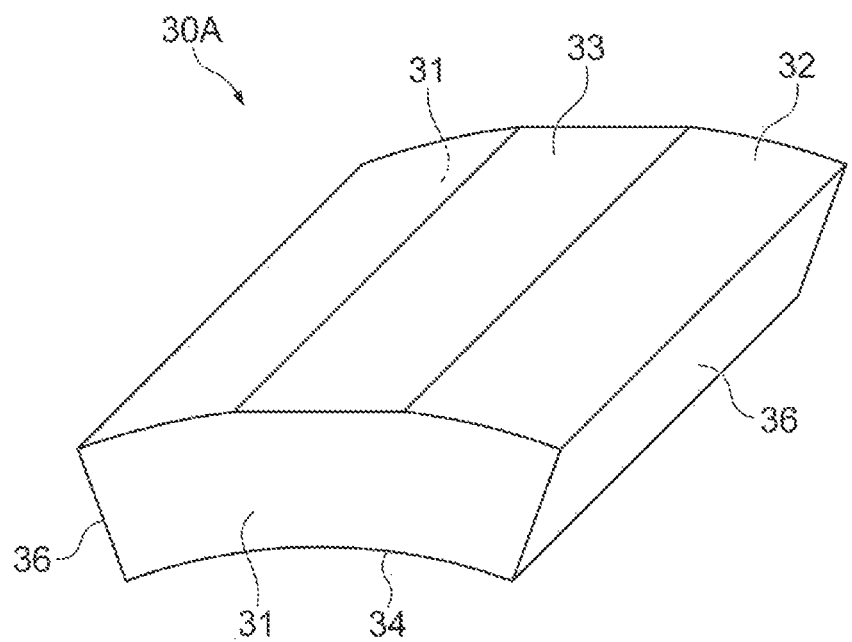
FIG. 6 is a schematic perspective view illustrating a different form of permanent magnet.
Figure 7:
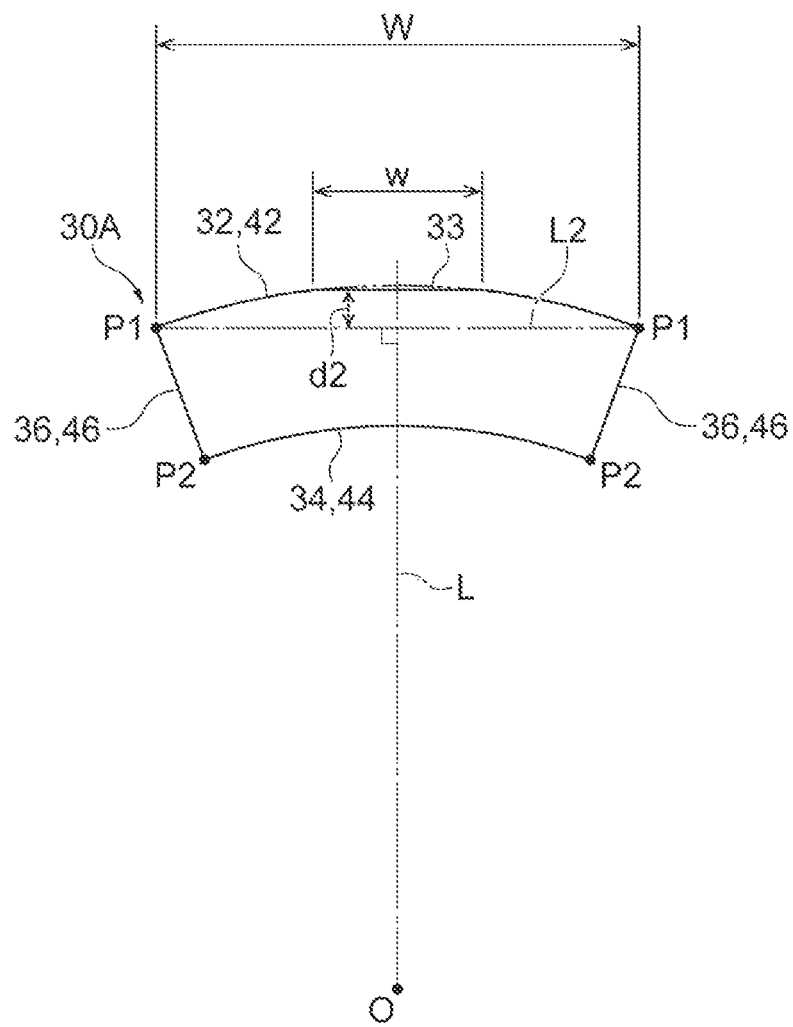
FIG. 7 is a schematic cross-sectional view of the permanent magnet illustrated in FIG. 6.

FIGS. 6 and 7 illustrate a permanent magnet 30A having a form that is different from that of the permanent magnet 30 described above. The permanent magnet 30A differs in the shape of the outer peripheral surface 32 and the shape of the side surface 36 from the permanent magnet 30 described above, and other shapes, dimensions, and the state of magnetization are the same as those of the permanent magnet 30.

The permanent magnet 30A does not have the parallel reference surface 37 described above, instead, has a perpendicular reference surface 33 in the outer peripheral surface 32. The perpendicular reference surface 33 is a surface that is perpendicular to the direction of the bisector L of the opening angle θ of the inner arc 44. The perpendicular reference surface 33 intersects the bisector L, and has symmetry with respect to the bisector L. The perpendicular reference surface 33 is positioned closer to the outside (that is, on a side separate from the inner arc 44) than the end point P1 of the outer arc 42. A length (hereinafter, referred to as a reference surface length) w of the perpendicular reference surface 33 in the direction orthogonal to the direction of the bisector L is 9 mm as an example. The reference surface length w of the perpendicular reference surface 33 depends on a separation distance d2 between a second reference line L2, which passes through the end points P1 of the outer arc 42 and is perpendicular to the bisector L, and the perpendicular reference surface 33. The shorter the separation distance d2 becomes, the longer the reference surface length w becomes. If the length (that is, width dimension) of the permanent magnet 30 on the second reference line L2 is W, the reference surface length w of the perpendicular reference surface 33 can be set so as to satisfy a relationship of $0.3 \leq w/W \leq 0.8$. The width dimension W of the permanent magnet 30A is the length of the permanent magnet 30A in the direction orthogonal to the direction of the bisector L. The width dimension W is equal to a separation distance between both end points P1 of the outer arc 42, and is 25.65 mm as an example.

It can be considered that the cross-sectional shape of the permanent magnet 30A having the perpendicular reference surface 33 is obtained by removing a portion (a portion defined by the two-dot chain line in FIG. 7) from the cross-sectional shape of a permanent magnet which does not have the perpendicular reference surface 33. The cross-sectional area of the permanent magnet 30A is further reduced than that of the permanent magnet which does not have the perpendicular reference surface 33. In addition, also the magnet volume of the permanent magnet 30A is further reduced than that of the permanent magnet that does not have the perpendicular reference surface 33.

Figure 8:
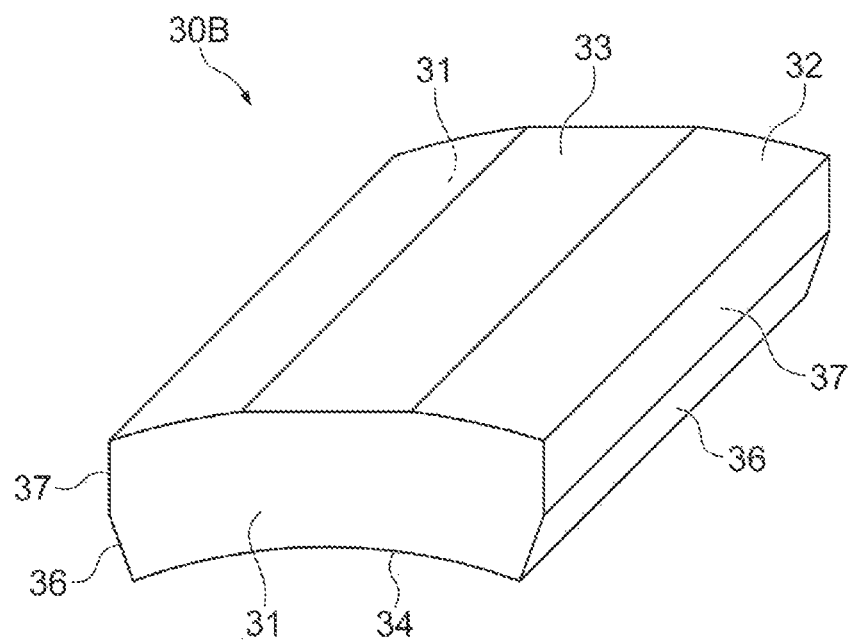
FIG. 8 is a schematic perspective view illustrating a different form of permanent magnet.
Figure 9:
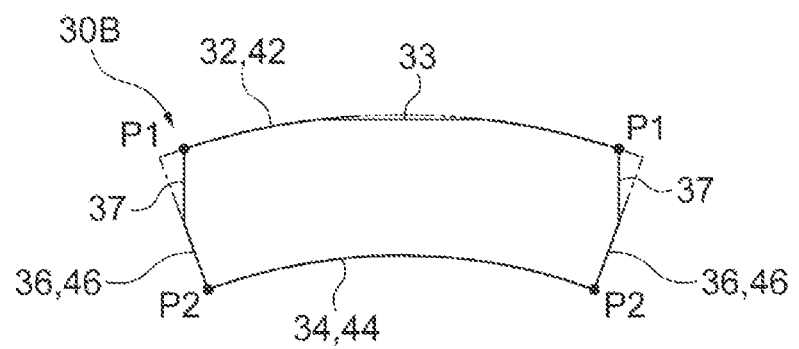
FIG. 9 is a schematic cross-sectional view of the permanent magnet illustrated in FIG. 8.

FIGS. 8 and 9 illustrate a permanent magnet 30B having a form that is different from that of the permanent magnet 30 described above. The permanent magnet 30B differs in the shape of the outer peripheral surface 32 from the permanent magnet 30 described above, and other shapes and dimensions and the state of magnetization are the same as those of the permanent magnet 30.

The permanent magnet 30B has the parallel reference surface 37 in each of the side surfaces 36, and has the perpendicular reference surface 33 in the outer peripheral surface 32.

It can be considered that the cross-sectional shape of the permanent magnet 30B having the parallel reference surface 37 and the perpendicular reference surface 33 is obtained by removing a portion (a portion defined by the two-dot chain line in FIG. 9) from the cross-sectional shape of a permanent magnet which does not have both of the parallel reference surface 37 and the perpendicular reference surface 33. The cross-sectional area of the permanent magnet 30B is further reduced than that of the permanent magnet which does not have both of the parallel reference surface 37 and the perpendicular reference surface 33. The cross-sectional area of the permanent magnet 30B is smaller than that of the permanent magnet 30 having the parallel reference surface 37 and that of the permanent magnet 30A having the perpendicular reference surface 33. In addition, also the magnet volume of the permanent magnet 30B is further reduced than that of the permanent magnet that does not have both of the parallel reference surface 37 and the perpendicular reference surface 33. The magnet volume of the permanent magnet 30B is smaller than that of the permanent magnet 30 having the parallel reference surface 37 and that of the permanent magnet 30A having the perpendicular reference surface 33.

In the permanent magnets 30, 30A, and 30B described above, since the parallel reference surface 37 reduces the magnet volume of a portion of the side surface 36, and the perpendicular reference surface 33 reduces the magnet volume of a portion of the outer peripheral surface 32, the magnet volumes of the permanent magnets 30, 30A, and 30B are further reduced than that of a permanent magnet that does not have the parallel reference surface 37 or the perpendicular reference surface 33.

The inventors have confirmed, by simulations illustrated hereinafter, that a decrease in magnet volume induced by the parallel reference surface 37 and the perpendicular reference surface 33 does not affect the characteristics of the IPM motor.

Hereinafter, set conditions and results of the simulations performed by the inventors will be described with reference to FIGS. 10 to 12.

In the simulations, a magnetic flux density (surface magnetic flux density) in the outer peripheral surface 14b of the rotor core 14 of a pair of the permanent magnets 30 illustrated in FIG. 3 from an angular position R0 to an angular position R1 along a reference line R aligned along the outer peripheral surface 14b of the rotor core 14 was obtained by using a finite element method. The angular position R0 and the angular position R1 are angular positions with respect to the rotation axis X. The angular position R0 and the angular position R1 are offset 45° from each other.

In the present simulation, a sample 1 having the shape of the permanent magnet 30, a sample 2 having the shape of the permanent magnet 30A, and a sample 3 having the shape of the permanent magnet 30B were used. In addition, for comparison, a sample 0 which does not have the parallel reference surface 37 or the perpendicular reference surface 33 was used.

Figure 10:
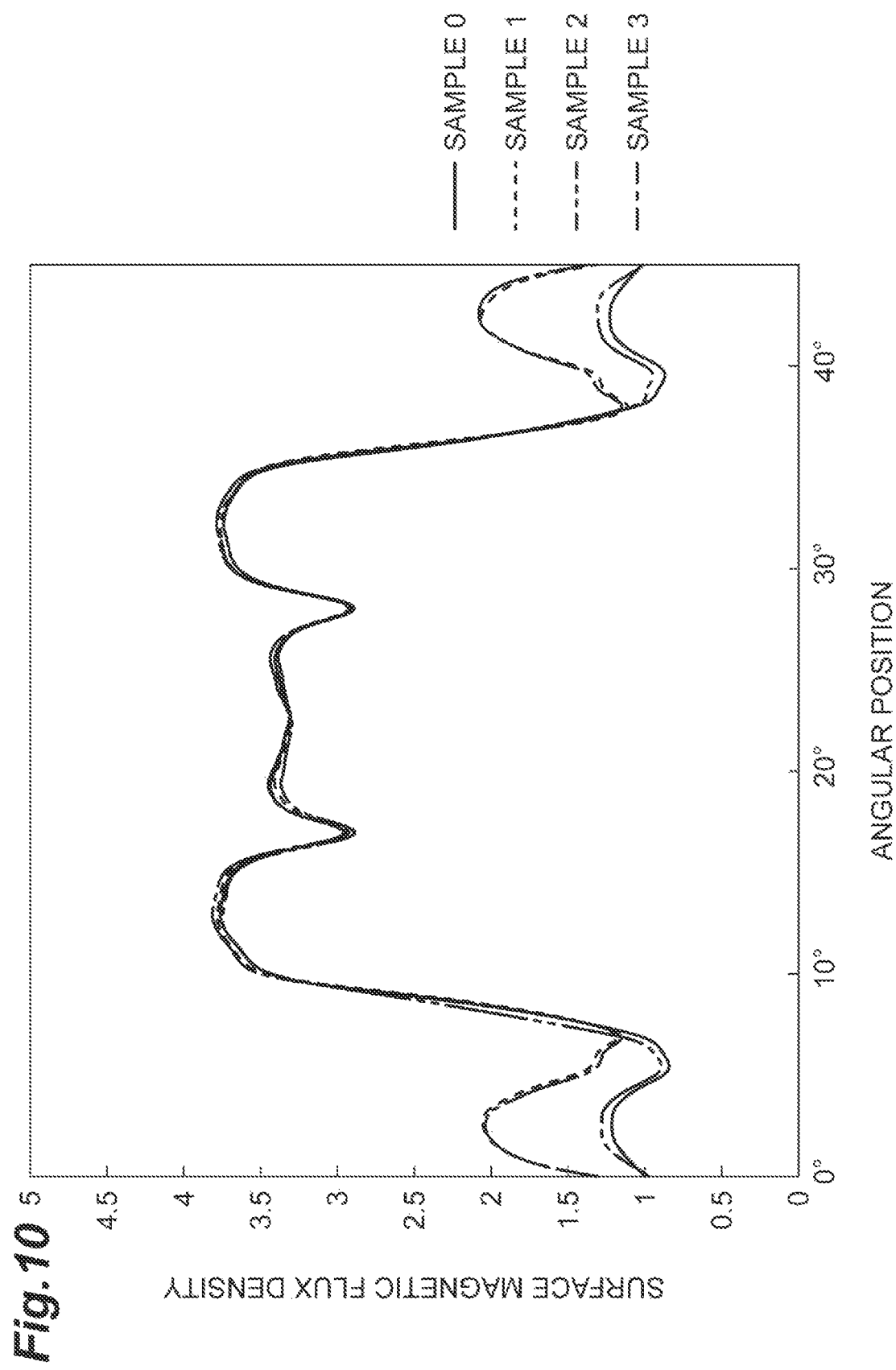
FIG. 10 is a graph showing a relationship between the angular position and the surface magnetic flux density of each form of permanent magnet.

A result of the simulation is as shown in the graph of FIG. 10. In the graph of FIG. 10, the horizontal axis is a relative angular position with reference to the angular position R0, and the vertical axis is the ratio of the surface magnetic flux density of each sample to the surface magnetic flux density of the sample 0.

As being obvious from the graph of FIG. 10, the surface magnetic flux densities of the samples 1 to 3 are not significantly different from the surface magnetic flux density of the sample 0. In particular, at angular positions 10 to 35° where the magnetic flux of each of a pair of permanent magnets concentrates, the surface magnetic flux densities of the samples 1 to 3 are substantially the same as the surface magnetic flux density of the sample 0.

Figure 11:
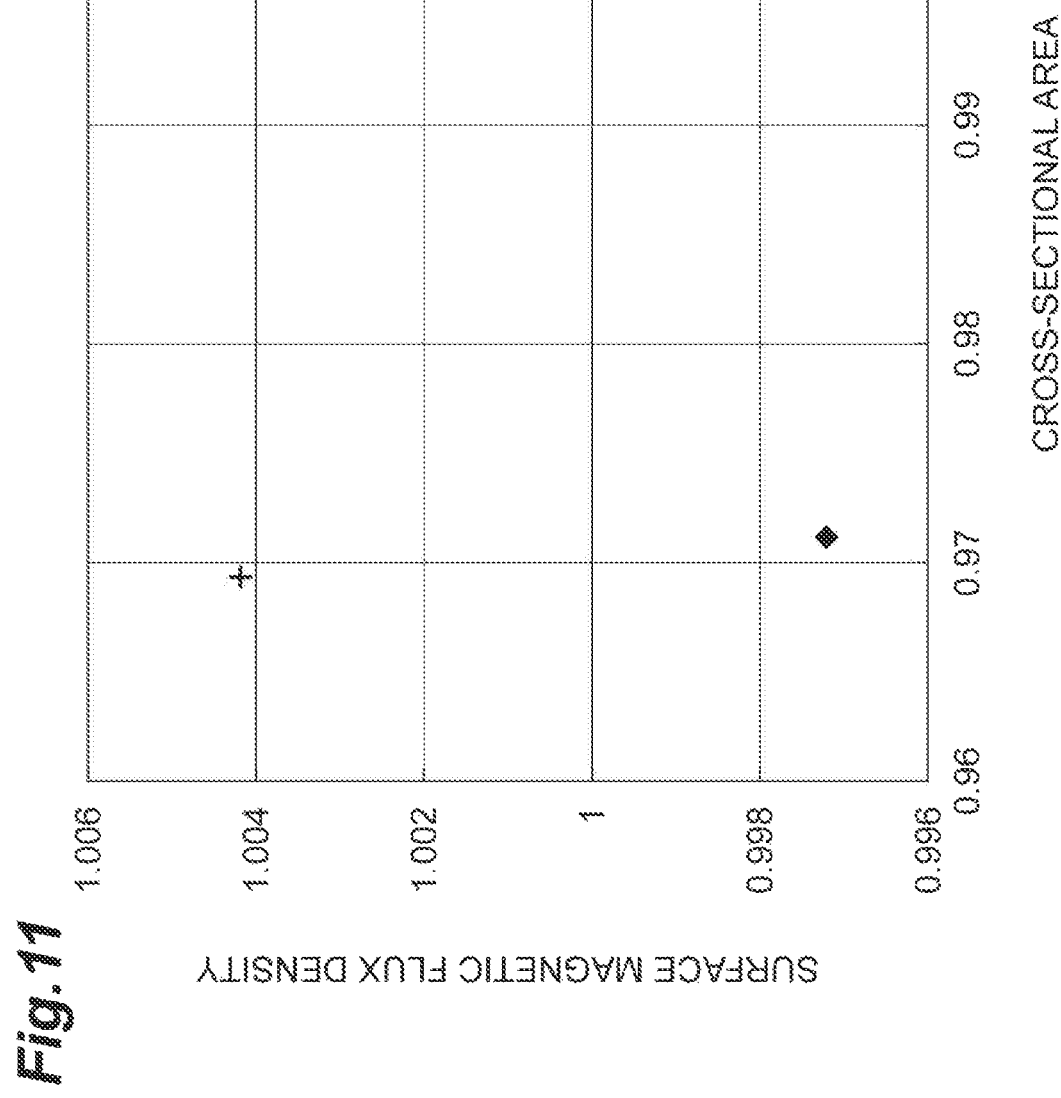
FIG. 11 is a graph showing a relationship between the cross-sectional area and the surface magnetic flux density of each form of permanent magnet.
Figure 12:
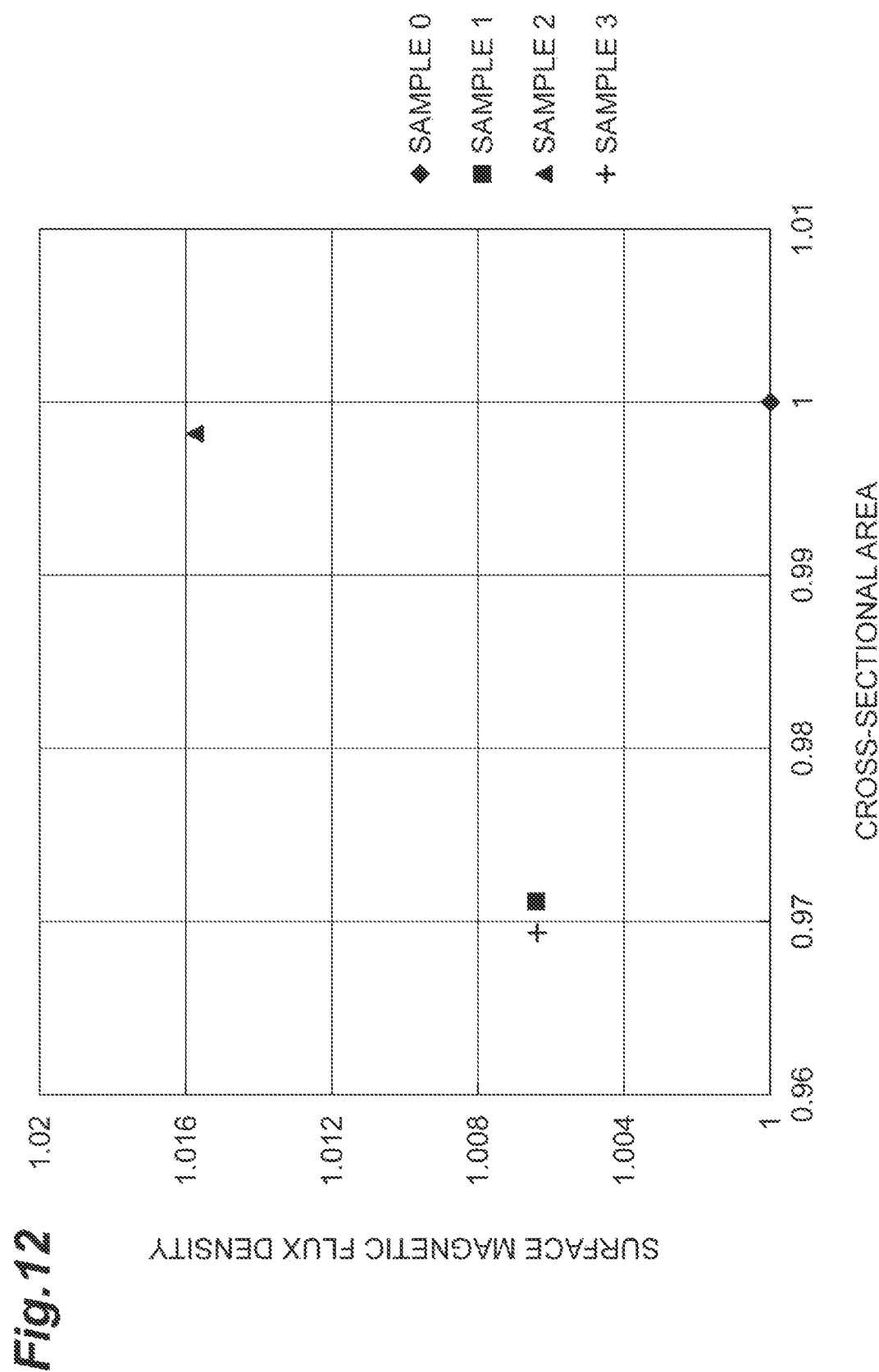
FIG. 12 is a graph showing a relationship between the cross-sectional area and the surface magnetic flux density of each form of permanent magnet.

The graphs of FIGS. 11 and 12 are graphs showing the surface magnetic flux density of each sample at predetermined angular positions. The graph of FIG. 11 shows the surface magnetic flux density of each sample at a relative angular position of 22.50 (that is, an intermediate position between the angular position R0 and the angular position R1) with reference to the angular position R0. The graph of FIG. 12 shows the surface magnetic flux density of each sample at a relative angular position of 25.625° with reference to the angular position R0. In the graphs of FIGS. 11 and 12, the horizontal axis is the ratio of the cross-sectional area of each sample to the cross-sectional area of the sample 0, and the vertical axis is the ratio of the surface magnetic flux density of each sample to the surface magnetic flux density of the sample 0.

As being obvious from the graphs of FIGS. 11 and 12, despite the fact that the cross-sectional areas of the sample 1, the sample 2, and the sample 3 are smaller than the cross-sectional area of the sample 0, no remarkable decrease in surface magnetic flux density at both of the angular positions (22.50 and 25.6250) has been confirmed.

From the simulation results described above, it has been confirmed that any of the surface magnetic flux densities of the sample 1 having a shape having the parallel reference surface 37, the sample 2 having a shape having the perpendicular reference surface 33, and the sample 3 having a shape having the parallel reference surface 37 and the perpendicular reference surface 33 is equal to the surface magnetic flux density of the sample 0 having a shape that does not have the parallel reference surface 37 or the perpendicular reference surface 33. That is, it has been confirmed that a decrease in magnet volume induced by the parallel reference surface 37 and the perpendicular reference surface 33 does not affect the surface magnetic flux density. Therefore, according to the permanent magnets 30, 30A, and 30B including at least either one of the parallel reference surface 37 and the perpendicular reference surface 33, it is possible to reduce the magnet volume while maintaining the characteristics of the IPM motor 1.

Figure 13:
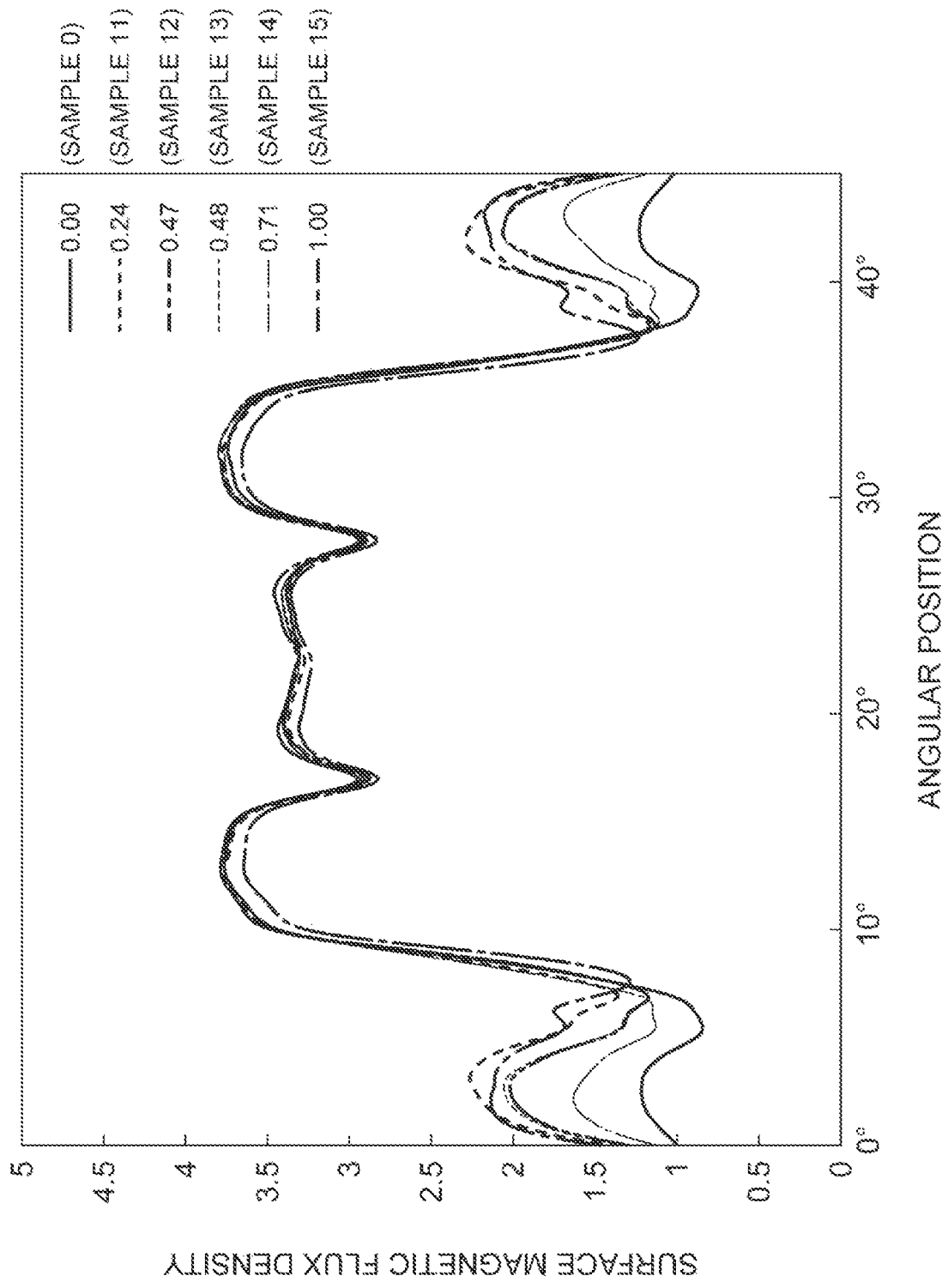
FIG. 13 is a graph showing relationships between the angular positions and the surface magnetic flux densities of permanent magnets having the form illustrated in FIG. 4.

In addition, in order to confirm the relationship between the reference surface length h of the parallel reference surface 37 and the surface magnetic flux density, the inventors measured the surface magnetic flux densities of a plurality of the samples 1, between which the ratio (h/H) of the reference surface length h of the parallel reference surface 37 to the magnet length H on the first reference line L1 differed, in the same set conditions as those described above. A result of the measurement is as shown in the graph of FIG. 13. In the graph of FIG. 13, the horizontal axis is a relative angular position with reference to the angular position R0, and the vertical axis is the ratio of the surface magnetic flux density of each sample to the surface magnetic flux density of the sample 0.

In the present simulation, samples 11 to 15, in which the ratios (h/H) of the reference surface length h of the parallel reference surface 37 are 0.24, 0.47, 0.48, 0.71, and 1.00, were used. In addition, for comparison, a sample (that is, the sample 0 having a shape that did not have the parallel reference surface 37), in which the ratio (h/H) of the reference surface length h of the parallel reference surface 37 was 0, was used.

As being obvious from the graph of FIG. 13, the surface magnetic flux densities of the samples 11 to 15 are not significantly different from the surface magnetic flux density of the sample 0. In particular, at angular positions 10 to 35° where the magnetic flux of each of a pair of permanent magnets concentrates, the surface magnetic flux densities of the samples 11 to 15 are substantially the same as the surface magnetic flux density of the sample 0.

Figure 14:
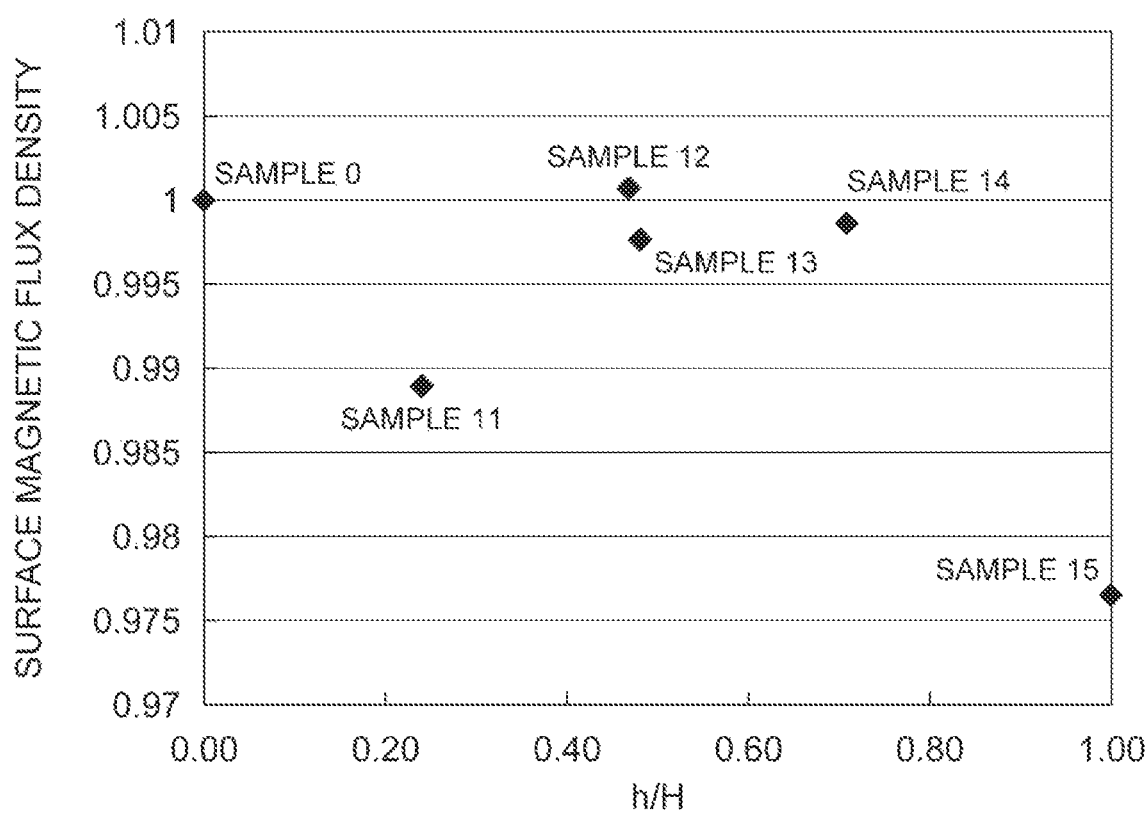
FIG. 14 is a graph showing relationships between the reference surface lengths and the surface magnetic flux densities of the permanent magnets having the form illustrated in FIG. 4.
Figure 15:
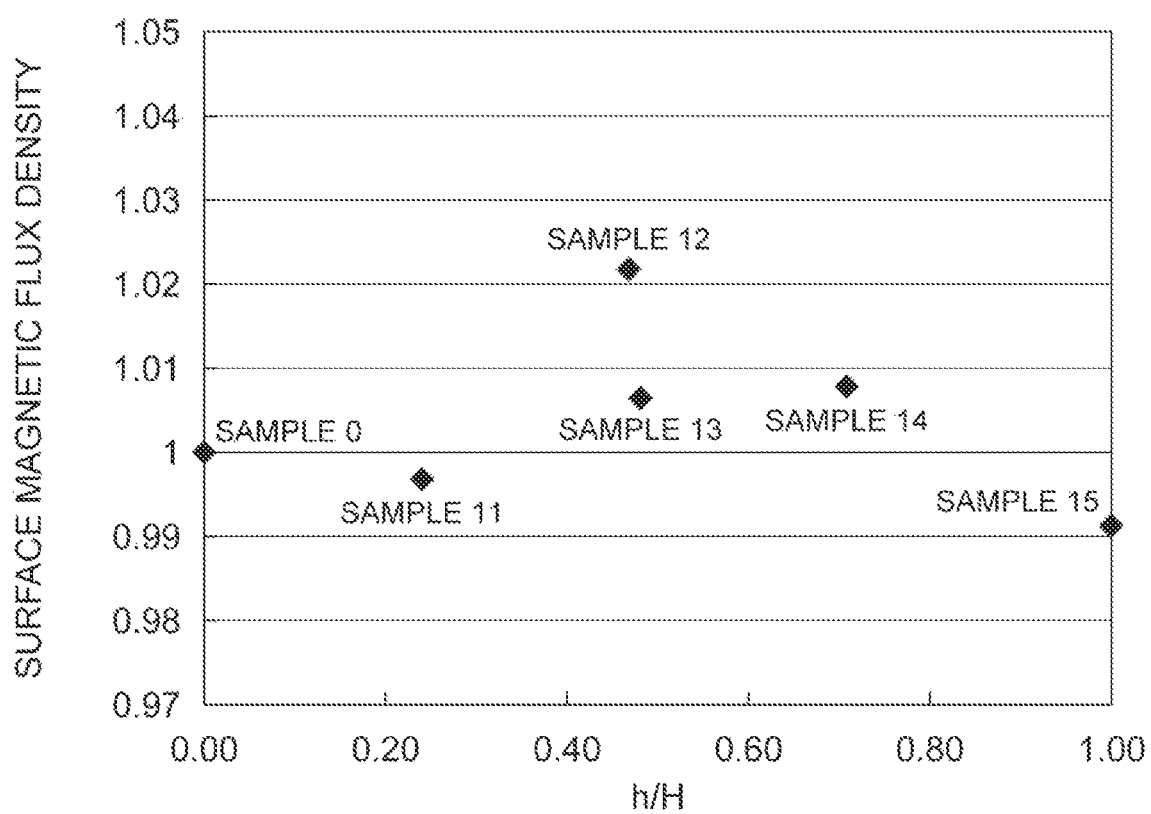
FIG. 15 is a graph showing relationships between the reference surface lengths and the surface magnetic flux densities of the permanent magnets having the form illustrated in FIG. 4.

The graphs of FIGS. 14 and 15 are graphs showing the surface magnetic flux density of each sample at predetermined angular positions. The graph of FIG. 14 shows the surface magnetic flux density of each sample at a relative angular position of 22.5° with reference to the angular position R0. The graph of FIG. 15 shows the surface magnetic flux density of each sample at a relative angular position of 25.625° with reference to the angular position R0. In the graphs of FIGS. 14 and 15, the horizontal axis is the ratio (h/H) of the reference surface length h of the parallel reference surface 37 of each sample, and the vertical axis is the ratio of the surface magnetic flux density of each sample to the surface magnetic flux density of the sample 0.

In the graphs of FIGS. 14 and 15, the surface magnetic flux densities of the samples 11 to 15 are equal to the surface magnetic flux density of the sample 0 at both of the angular positions (22.50 and 25.625°). In particular, it has been confirmed that the surface magnetic flux densities of the samples 12 to 14 in which the ratios are in a range of 0.3≤h/H≤0.8 are very close to the surface magnetic flux density of the sample 0.

From the simulation results described above, it has been confirmed that the characteristics of the IPM motor are maintained with a higher probability by setting the reference surface length h of the parallel reference surface 37 so as to satisfy the relationship of 0.3≤h/H≤0.8.

Figure 16:
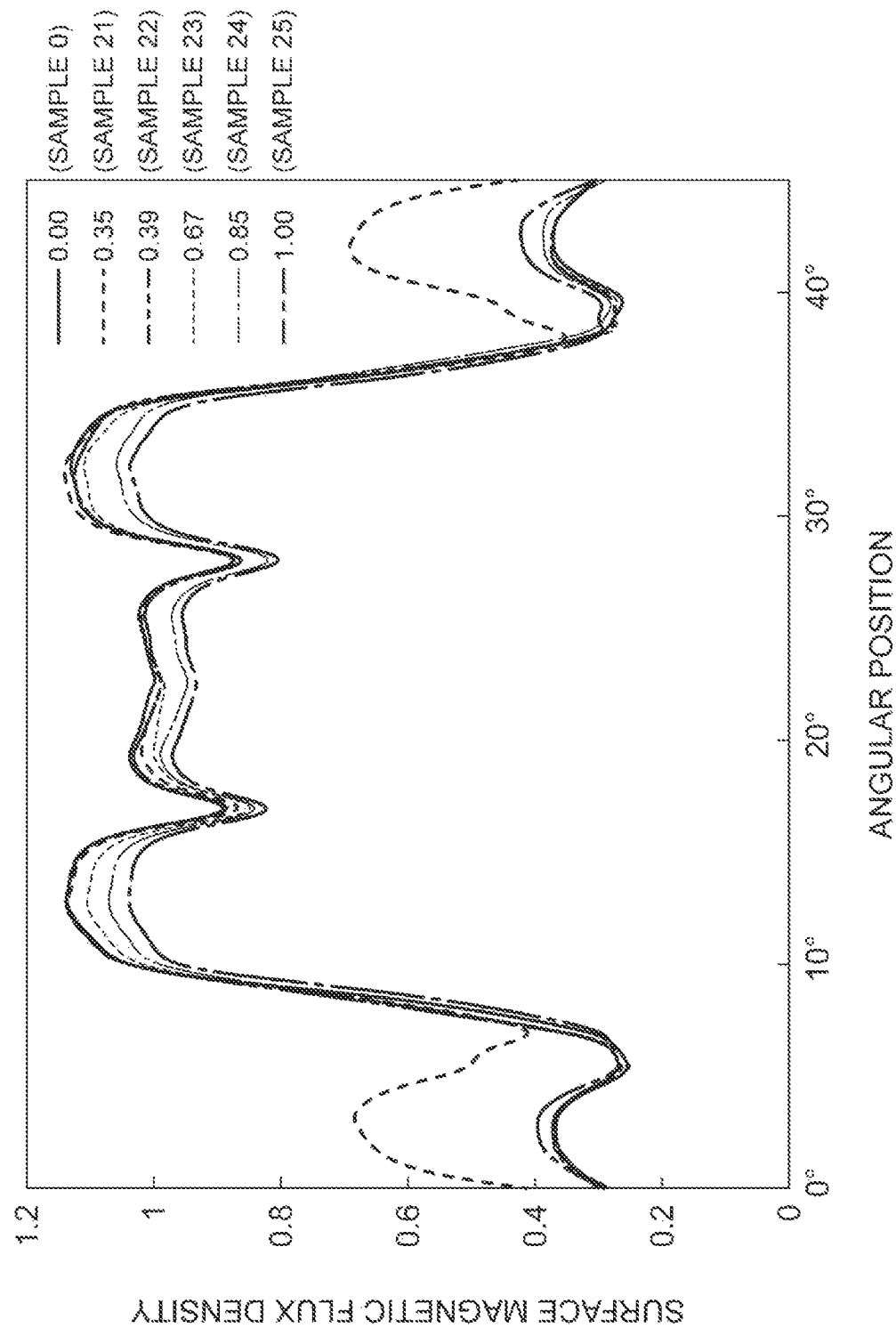
FIG. 16 is a graph showing relationships between the angular positions and the surface magnetic flux densities of permanent magnets having the form illustrated in FIG. 6.

Furthermore, in order to evaluate the relationship between the reference surface length w of the perpendicular reference surface 33 and the surface magnetic flux density, the inventors measured the surface magnetic flux densities of a plurality of the samples 2, between which the reference surface length w of the perpendicular reference surface 33 to the magnet length W on the second reference line L2 differed, in the same method as that described above. A result of the measurement is as shown in the graph of FIG. 16. In the graph of FIG. 16, the horizontal axis is a relative angular position with reference to the angular position R0, and the vertical axis is the ratio of the surface magnetic flux density of each sample to the surface magnetic flux density of the sample 0.

In the present simulation, samples 21 to 25, in which the ratios (w/W) of the reference surface length w of the perpendicular reference surface 33 were 0.35, 0.39, 0.67, 0.85, and 1.00, were used. In addition, for comparison, a sample (that is, the sample 0 having a shape that does not have the perpendicular reference surface 33), in which the ratio (w/W) of the reference surface length w of the perpendicular reference surface 33 is 0, was used.

As being obvious from the graph of FIG. 16, the surface magnetic flux densities of the samples 21 to 25 are not significantly different from the surface magnetic flux density of the sample 0.

Figure 17:
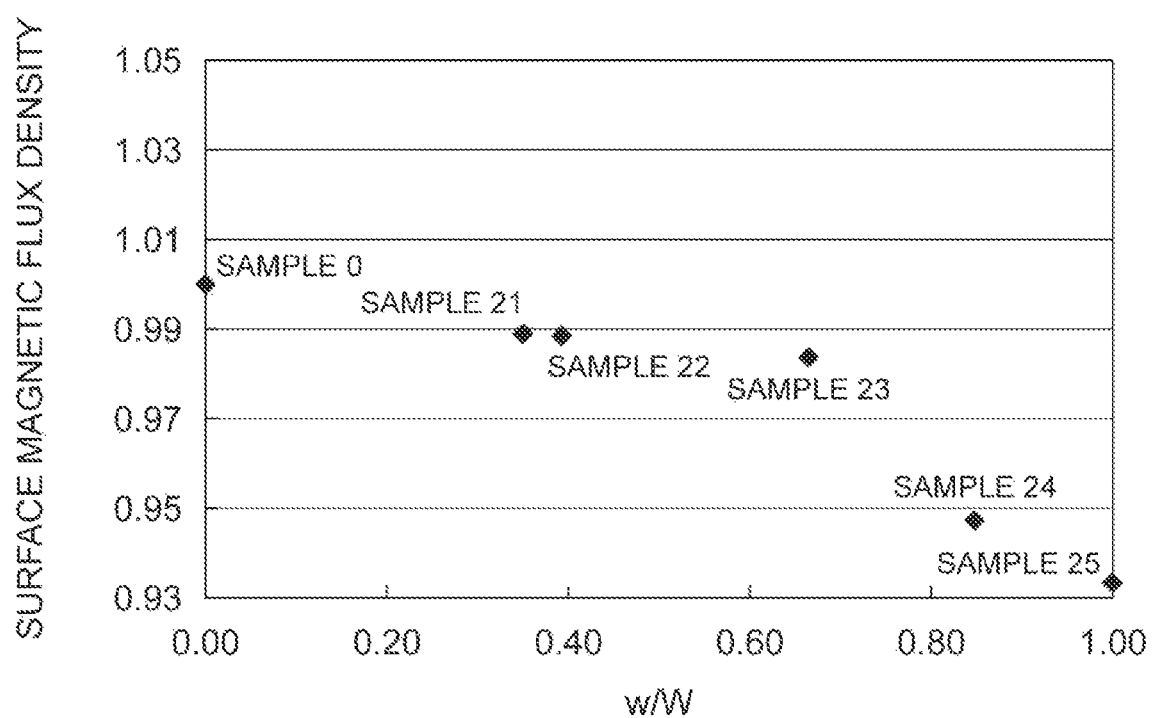
FIG. 17 is a graph showing relationships between the reference surface lengths and the surface magnetic flux densities of the permanent magnets having the form illustrated in FIG. 6.
Figure 18:
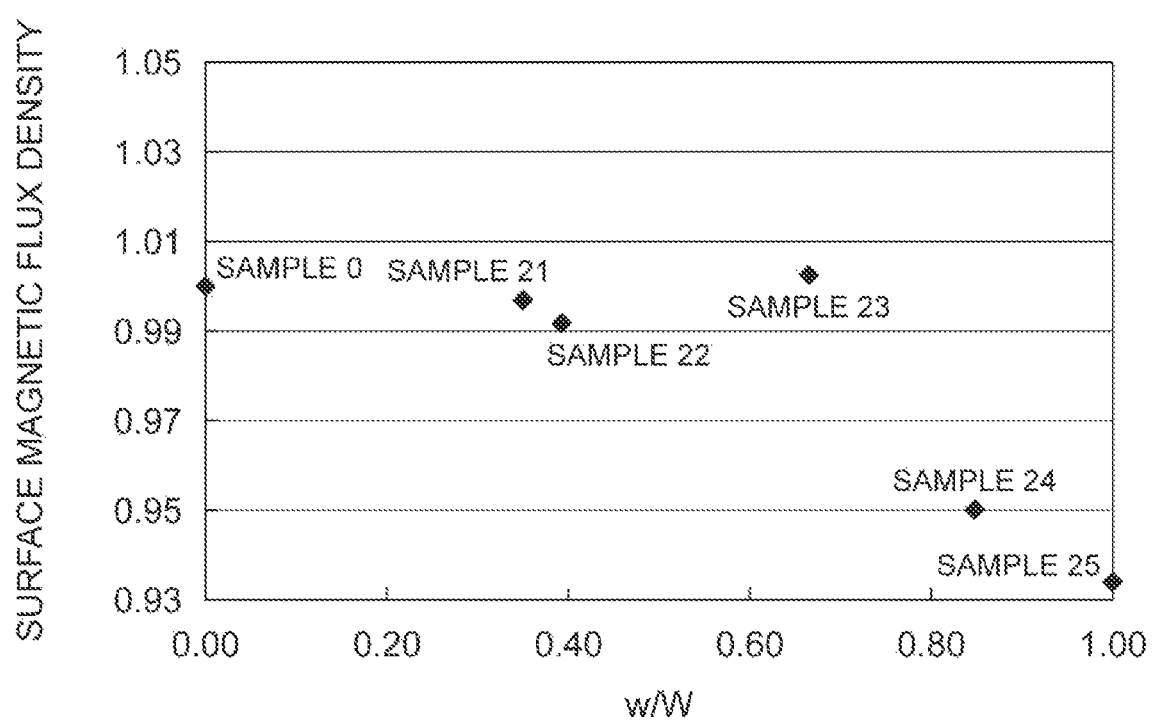
FIG. 18 is a graph showing relationships between the reference surface lengths and the surface magnetic flux densities of the permanent magnets having the form illustrated in FIG. 6.

The graphs of FIGS. 17 and 18 are graphs showing the surface magnetic flux density of each sample at predetermined angular positions. The graph of FIG. 17 shows the surface magnetic flux density of each sample at a relative angular position of 22.5° with reference to the angular position R0. The graph of FIG. 18 shows the surface magnetic flux density of each sample at a relative angular position of 25.625° with reference to the angular position R0. In the graphs of FIGS. 17 and 18, the horizontal axis is the ratio (w/W) of the reference surface length w of the perpendicular reference surface 33 of each sample, and the vertical axis is the ratio of the surface magnetic flux density of each sample to the surface magnetic flux density of the sample 0.

In the graphs of FIGS. 17 and 18, the surface magnetic flux densities of the samples 21 to 25 are equal to the surface magnetic flux density of the sample 0 at both of the angular positions (22.50 and 25.625°). In particular, it has been confirmed that the surface magnetic flux densities of the samples 21 to 23 in which the ratios are in a range of 0.3≤w/W≤0.8 are very close to the surface magnetic flux density of the sample 0.

From the simulation results described above, it has been confirmed that the characteristics of the IPM motor are maintained with a higher probability by setting the reference surface length w of the perpendicular reference surface 33 so as to satisfy the relationship of 0.3≤w/W≤0.8.

The rotor according to the present disclosure is not limited to the embodiment described above, and can be modified in various forms.

For example, it is possible to appropriately increase or decrease the number of the poles or the number of the slots of the IPM motor. In addition, in the embodiment described above, the motor (electric motor) which is one type of rotating electrical machine has been described; however, the present disclosure can be applied also to a generator which is one type of rotating electrical machine.

What is claimed is:

1. A permanent magnet having an arc shape cross section defined by an outer arc, an inner arc, and a pair of end sides connecting respective end points of the outer arc and respective end points of the inner arc, and at least a perpendicular reference surface of the perpendicular reference surface and a parallel reference surface, the parallel reference surface is provided in each side surface defined by respective end sides and is parallel to a direction of a bisector of an opening angle of the inner arc in the cross section, wherein the perpendicular reference surface is planar and is provided in an outer peripheral surface defined by the outer arc and is perpendicular to the direction of the bisector of the opening angle of the inner arc in the cross section, wherein the outer peripheral surface includes the perpendicular reference surface and respective curved surfaces extending from each end of the perpendicular reference surface, and wherein in the cross section, when a length of the perpendicular reference surface in a direction orthogonal to the direction of the bisector of the opening angle of the inner arc is w and a length on a second reference line passing through the end points of the outer arc and orthogonal to the direction of the bisector of the opening angle of the inner arc is W, 0.3 w/W 0.8 is satisfied.

2. The permanent magnet according to claim 1, wherein in the cross section, when a length of the parallel reference surface in the direction of the bisector of the opening angle of the inner arc is h and a length on a first reference line passing through the end point of the inner arc and parallel to the direction of the bisector of the opening angle of the inner arc is H, 0.3 h/H 0.8 is satisfied.

3. The permanent magnet according to claim 1, wherein the permanent magnet is radially magnetized with reference to a virtual center which is positioned close to the inner arc in the cross section.

4. The permanent magnet according to claim 1, wherein a range of an opening angle θ of the inner arc is 10°≤θ≤90°.

5. The permanent magnet according to claim 1, wherein the permanent magnet includes both of the parallel reference surface and the perpendicular reference surface.

6. A rotating electrical machine comprising:
a rotor having a shaft and a rotor core to which a plurality of permanent magnets according to claim 1 are attached so as to surround the shaft; and
a stator disposed on an outer periphery of the rotor and having a plurality of coils.

* * * * *